US007689749B2

(12) United States Patent
Herczog

(10) Patent No.: US 7,689,749 B2
(45) Date of Patent: Mar. 30, 2010

(54) INTERRUPT CONTROL FUNCTION ADAPTED TO CONTROL THE EXECUTION OF INTERRUPT REQUESTS OF DIFFERING CRITICALITY

(75) Inventor: Eugène Pascal Herczog, Cambridge (GB)

(73) Assignees: MStar Semiconductor, Inc. (KY); MStar Software R&D, Ltd., Shenzen (TW); MStar France SAS, Issy les Mouineaux (FR); MStar Semiconductor, Inc. (TW)

( * ) Notice: Subject to any disclaimer, the term of this patent is extended or adjusted under 35 U.S.C. 154(b) by 39 days.

(21) Appl. No.: 11/665,544

(22) PCT Filed: Oct. 17, 2005

(86) PCT No.: PCT/GB2005/003994

§ 371 (c)(1),
(2), (4) Date: Feb. 26, 2008

(87) PCT Pub. No.: WO2006/043040

PCT Pub. Date: Apr. 27, 2006

(65) Prior Publication Data
US 2008/0195785 A1  Aug. 14, 2008

(30) Foreign Application Priority Data
Oct. 18, 2004 (GB) ............................... 0423094.2

(51) Int. Cl.
G06F 13/24 (2006.01)
(52) U.S. Cl. .................. 710/264; 710/261; 710/267
(58) Field of Classification Search .......... 710/260–269
See application file for complete search history.

(56) References Cited
U.S. PATENT DOCUMENTS
4,734,882 A * 3/1988 Romagosa .................. 710/264
(Continued)

FOREIGN PATENT DOCUMENTS
EP     0 360 135 B1    3/1990
(Continued)

OTHER PUBLICATIONS
Silberschatz et al., "Operating System Concepts 6th Edition", John Wiley & Sons, Inc. 2003.

Primary Examiner—Raymond N Phan
(74) Attorney, Agent, or Firm—Edell, Shapiro & Finnan, LLC

(57) ABSTRACT

An interrupt controller (1) is adapted to control the execution of interrupt requests (11, 12) of differing criticality by a processor (7) which is required to execute tasks (3, 17) of differing criticality under the control of a computer operating system (5); the interrupt controller being adapted to recognize critical (11) and non-critical (12) interrupt requests originating from different interrupt sources, and to recognize when the processor (7) is required to execute each of critical (3) and non-critical tasks (17); the interrupt controller being further adapted to pass critical interrupt requests (11) to the processor (7) for execution in preference to non-critical interrupt requests (12), to block non-critical interrupt requests (12) to the processor when they coexist with critical interrupt requests (11) or the processor (7) is required to execute critical tasks (3), and to pass non-critical interrupt requests (12) to the processor (7) when they do not coexist with any critical interrupt requests (11) and the processor (7) has no critical tasks (3) to be executed. The interrupt controller (1) is preferably implemented in hardware and its operation is transparent to the processor (7).

18 Claims, 7 Drawing Sheets

U.S. PATENT DOCUMENTS

Figure 1:
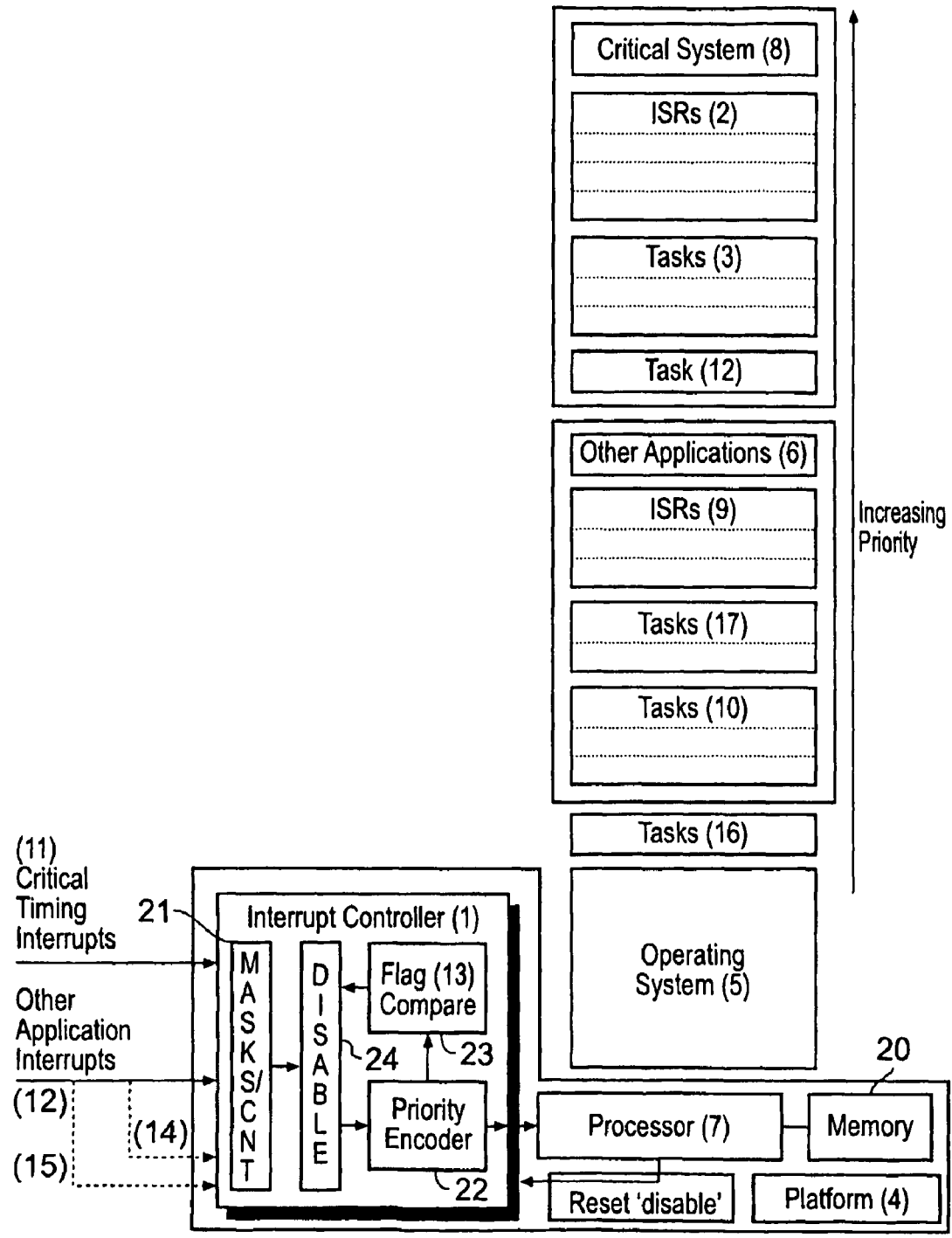

| | | |
|---|---|---|
| 5,919,255 A * | 7/1999 | Seshan et al. ............... 710/262 |
| 5,995,745 A | 11/1999 | Yodaiken |
| 6,061,709 A | 5/2000 | Bronte |
| 6,212,592 B1 | 4/2001 | Klein |
| 6,601,122 B1 * | 7/2003 | Broberg et al. .............. 710/266 |
| 7,149,831 B2 * | 12/2006 | Ruemmler et al. .......... 710/260 |
| 7,165,134 B1 * | 1/2007 | Kardach ...................... 710/264 |
| 7,222,203 B2 * | 5/2007 | Madukkarumukumana et al. ......................... 710/260 |
| 7,434,224 B2 * | 10/2008 | Lescouet et al. ............ 718/108 |
| 2007/0198759 A1 * | 8/2007 | Agarwal ...................... 710/260 |

FOREIGN PATENT DOCUMENTS

| EP | 0 764 901 B1 | 3/1997 |
|---|---|---|
| WO | WO 88/06317 | 8/1988 |
| WO | WO 00/06084 | 2/2000 |

* cited by examiner

INTERRUPT CONTROL FUNCTION ADAPTED TO CONTROL THE EXECUTION OF INTERRUPT REQUESTS OF DIFFERING CRITICALITY

This invention relates to control of the execution of interrupts in a processor, especially a processor in a system designed to support both critical and non-critical processes.

Most common computing systems, such as personal computers, do not have to deal with severe real-time requirements. Though there are applications, such as media streaming, which do impose significant processing loads on the processor, if the requirements exceed the processing capability of the machine for short periods the result is a minor artefact in the replayed stream (provided that there are adequate error recovery provisions) which the viewer tends to overlook. On the other hand, such systems place a premium on flexibility and frequently use "open operating systems" such as Microsoft Windows or Linux. These systems allow anyone to write software that will run on any computer running the OS, whatever its hardware specification. The result is that there is frequent conflict between different applications; and often the user finds it very hard to make a piece of software work correctly because of differences between the assumed and actual hardware performance and configuration.

There are also processor applications where the processor needs to meet severe real-time constraints and where the consequences of failure can (sometimes literally) be fatal. Examples are flight control systems for aircraft; engine management systems; and processors used in mobile communications devices. In these applications it is usual to control very carefully the software that is permitted to run in the processor; to test it rigorously; and often to segregate the hardware so that non-critical software runs on other processors.

In applications such as mobile phones there are also pressures to deploy open operating systems such as Linux, to make it easy for applications to be "ported" to the phones from other devices and widen the pool of programmers able to generate application software. At the same time there are pressures to reduce the amount of hardware in phones to minimise cost and power consumption, leading to a desire to run applications under open operating systems on the same processor cores which also have to execute critical real-time software.

A real time, timing critical system will typically have multiple sources of interrupts and multiple tasks that need supporting on the same processor. It is possible to give priority to the interrupts compared with the tasks so that critical operations are not compromised. Interrupts can be given different priorities relative to one another, and the processor will respond to these priorities so as to always give precedence to an interrupt with a higher priority, the Interrupt Service Routine (ISR) of a current lower priority interrupt being deferred and completed once the ISR of the higher priority interrupt has been completed. In this way, two or more interrupts of different priority may pre-empt one another and cause nesting of deferred ISRs in the processor. The tasks may also be given different relative priorities, and the operating system of the processor will take account of these priorities when executing the tasks. However, the interrupt function in the processor will always give priority to interrupts over tasks and this arrangement ensures that the latencies of all interrupts and tasks are minimized and any latencies and the execution time of interrupts and tasks are consistent.

However, if additional non-critical applications are to be supported by the same processor, and these applications also involve corresponding interrupts and tasks, it is only possible to support these on the same basis as the interrupts and tasks of the critical system, and thus the interrupt function in the processor will automatically give precedence to interrupts of the non-critical application over tasks of the critical system, which is then likely to compromise the performance of the critical system.

It is an object of the invention to provide an arrangement which will allow critical and non-critical processes to run on the same processor core without compromising operation of the critical processes.

This is achieved according to the invention by providing an interrupt control function adapted to control the execution of interrupt requests of differing criticality by a processor which is required to execute tasks of differing criticality under the control of a computer operating system, the interrupt control system being adapted to recognise critical and non-critical interrupt requests originating from different interrupt sources and to recognise when the processor is required to execute each of critical and non-critical tasks, the interrupt control system being adapted to pass critical interrupt requests to the processor for execution in preference to non-critical interrupt requests, to block non-critical interrupt requests to the processor when they coexist with critical interrupt requests or the processor is required to execute critical tasks, and to pass non-critical interrupt requests to the processor when they do not coexist with any critical interrupt requests and the processor has no critical tasks to be executed.

Thus the invention involves classification of interrupts as critical and non-critical interrupts and tasks as critical and non-critical tasks, and provides an interrupt control function which will give absolute priority to critical interrupts, and then priority to critical tasks over non-critical interrupts and non-critical tasks. In this way the latency requirement of the critical system can be met.

The interrupt control function can be implemented as software, but it is preferably implemented in hardware and receives all interrupt requests and passes these onto the processor in accordance with the required priorities. Therefore, the control of priority as between critical and non-critical interrupts is a process which is transparent to the processor itself, and there is no overhead requirements in the processor.

Figure 2:
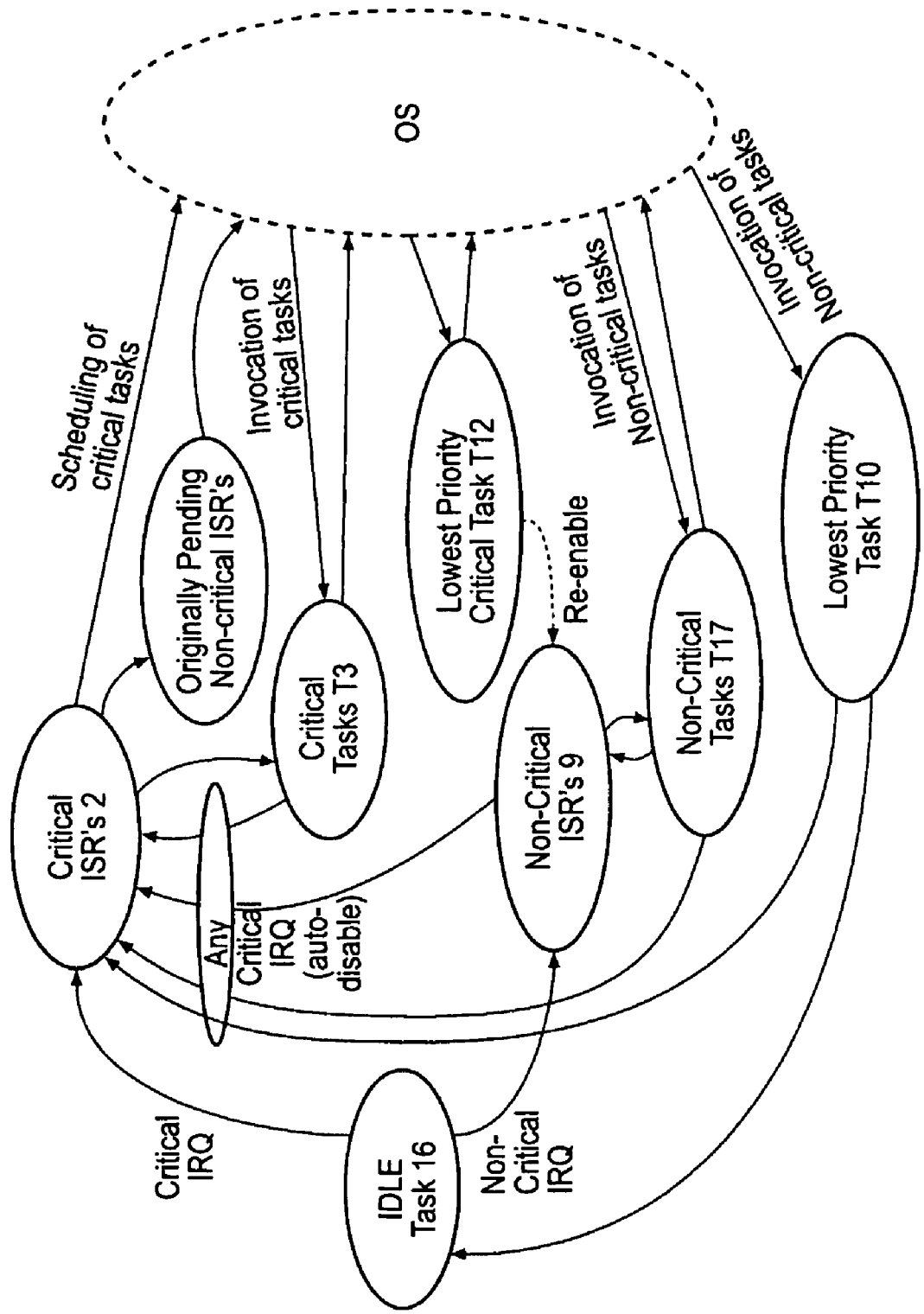
Figure 3:
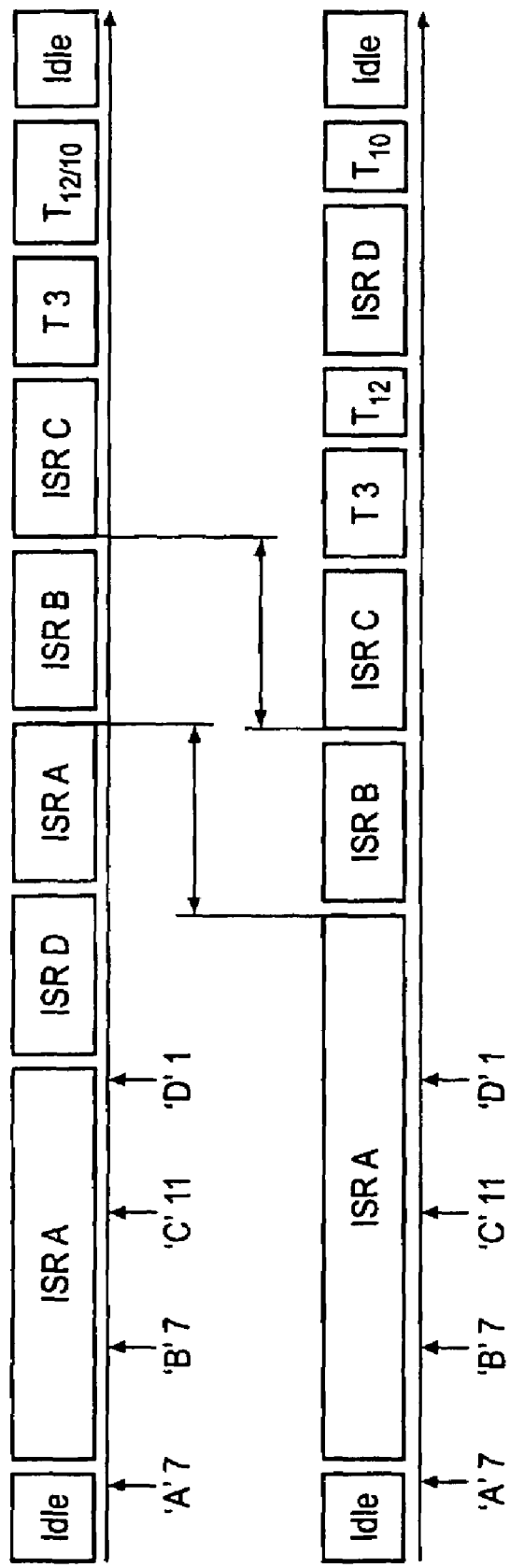
Figure 4:
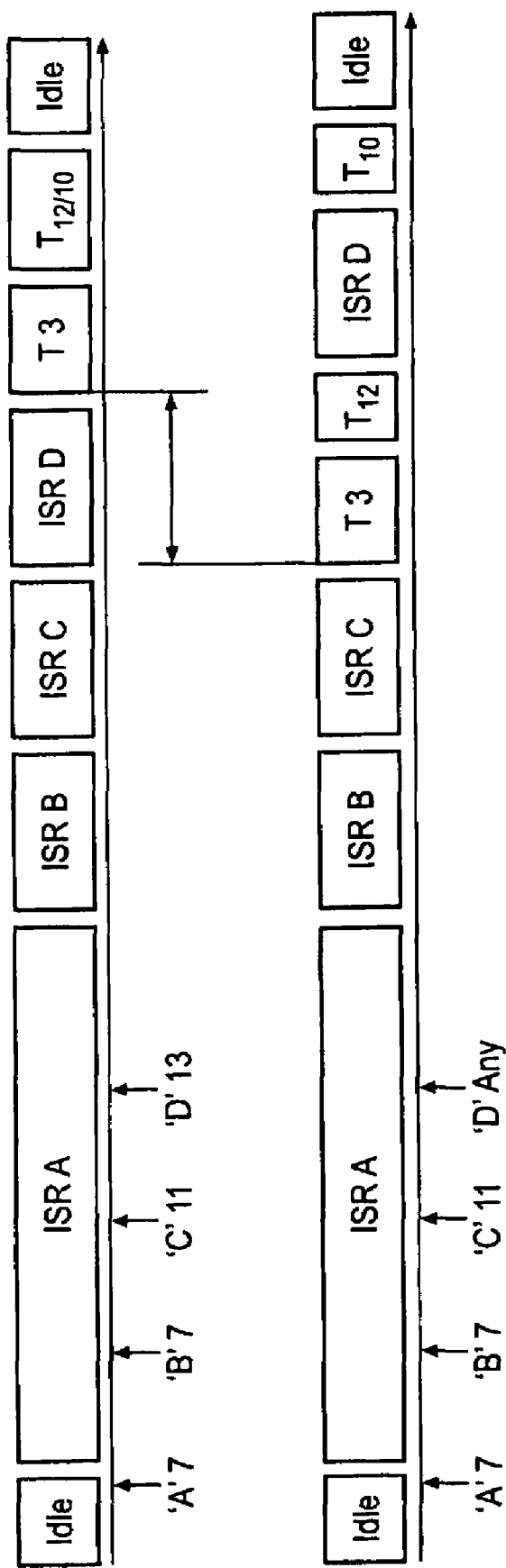
Figure 5:
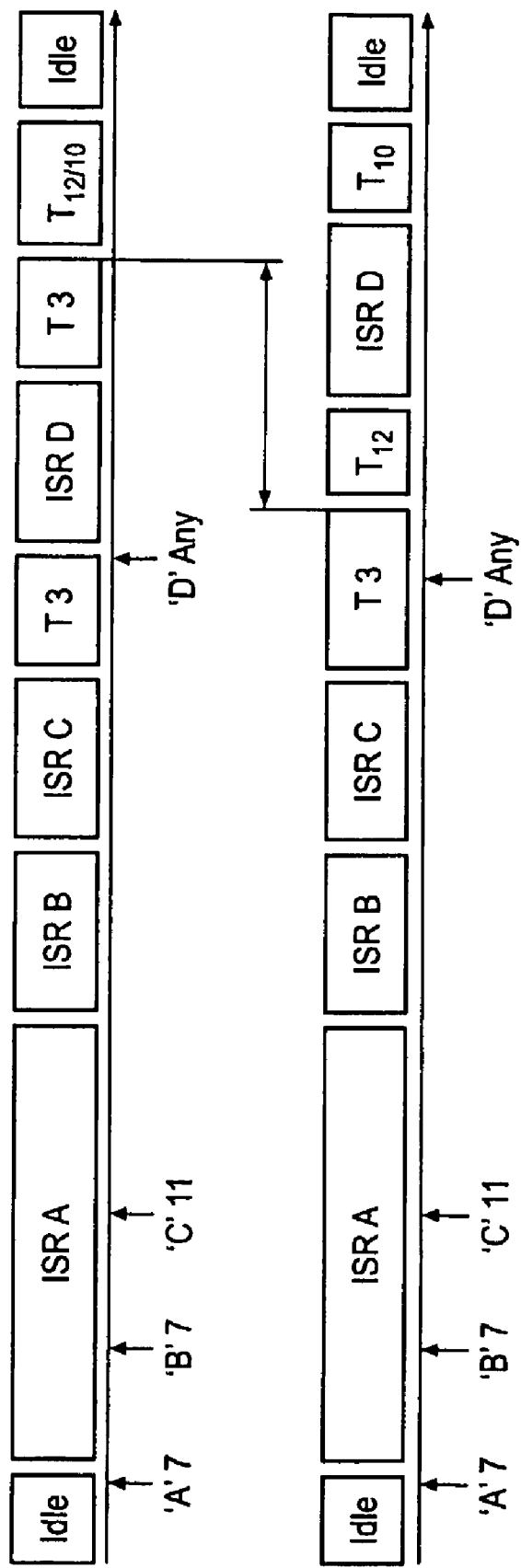
Figure 6:
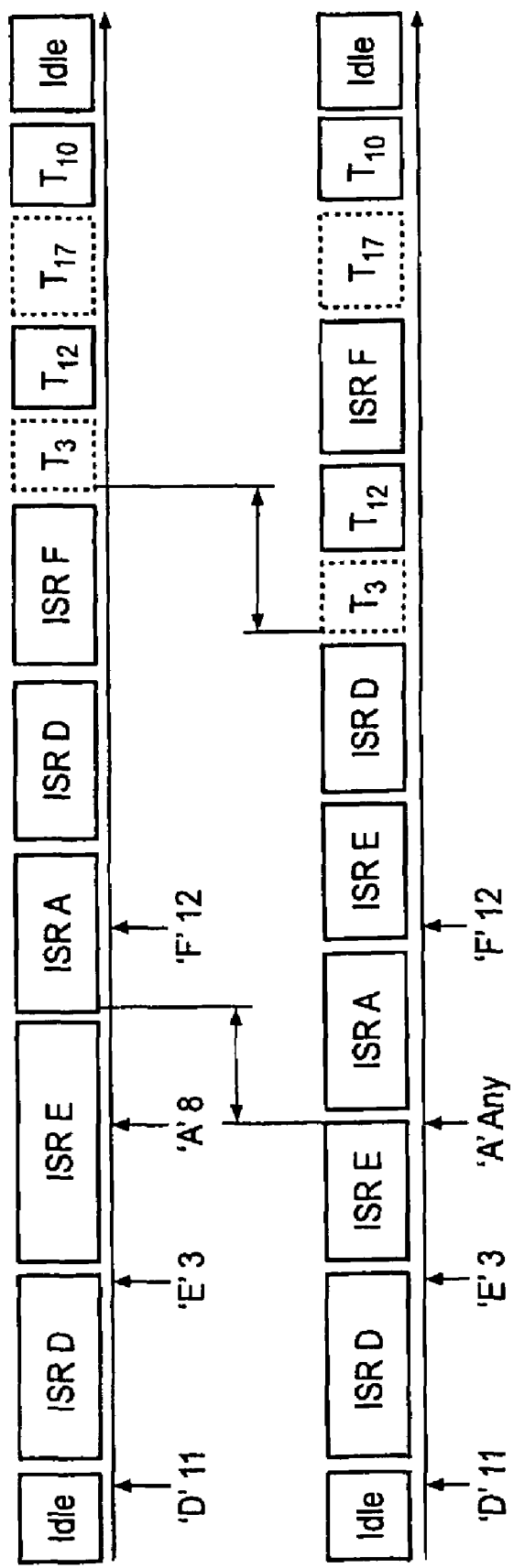
Figure 7:
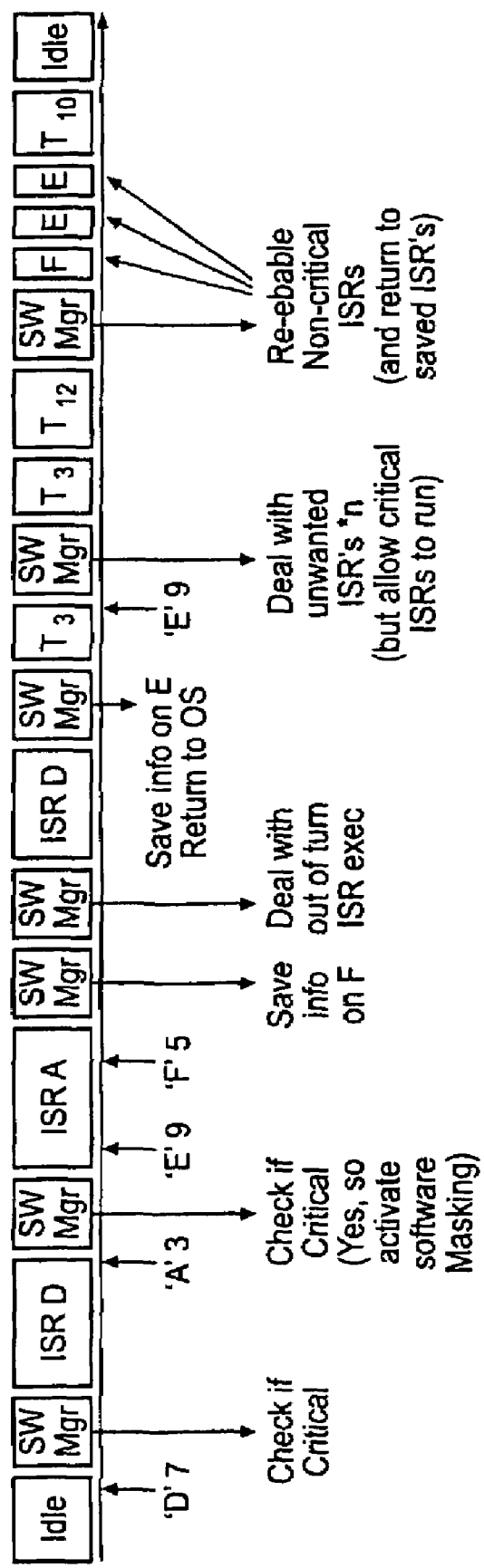

The invention will now be described by way of example with reference to the accompanying drawings in which:

FIG. 1 shows a schematic diagram of a timing critical system incorporating an interrupt control function according to the invention, FIG. 2 is a diagram showing an overview of the operations occurring within the timing critical system of FIG. 1, FIG. 3 is a diagram showing the operation of the system of FIG. 1 in handling multiple critical ISRs, FIG. 4 is a diagram showing operation of the system of FIG. 1 in handling critical ISRs and critical tasks, FIG. 5 is a diagram showing operation of the system of FIG. 1 in handling critical tasks and non-critical ISRs, FIG. 6 is a diagram showing operation of the system of FIG. 1 in handling nested non-critical ISRs, and FIG. 7 is a diagram showing operation of a software emulation of the critical interrupt controller in FIG. 1.

FIG. 1 illustrates a computing system comprising a computer platform 4 including a processor 7, a memory 20 and a generic computer operating system 5. A real time, timing critical system 8 runs on the platform 4 together with additional applications 6 which are not timing critical.

The timing critical system 8 has one or more sources of interrupt requests (IRQs) associated with it, which are designated as critical interrupts 11, and each source is marked as critical by a flag 13 which is set. Each critical interrupt 11 has associated with it an interrupt service routine (ISR) 2, which is executed by the processor 7 when triggered by the critical interrupt 11. The timing critical system 8 also has critical tasks 3 associated with it which are of lower priority than the critical interrupts 11.

The other applications 6 also have one or more sources of interrupt requests (IRQs) associated with them, which are designated as non-critical interrupts 12 and marked as non-critical by said flag 13 not being set. Each non-critical interrupt 12 has associated with it a non-critical interrupt service routine (ISR) 9 which is executed by the processor 7 when triggered by a non-critical interrupt 12. The other applications also have non-critical tasks 17 associated with them.

As indicated by the stacking order of the ISRs and tasks in FIG. 1, the non-critical interrupts 12 have lower priority than the critical interrupts 11 and critical tasks 13, and the non-critical tasks 17 have lower priority than the critical interrupts 11 and critical tasks 3 and non-critical interrupts 9. Each interrupt in each category, critical or non-critical, is given a priority relative to other interrupts in the same category, and each task in each category, critical and non-critical, is also given its own priority relative to other tasks within the same category. These relative priorities determine the order in which interrupts within each category are executed. Thus the same priority scale in the system can be used for both critical and non-critical interrupts. However, as previously indicated, critical tasks are always given higher priority than non-critical tasks on the same priority scale.

An interrupt controller 1 is provided which receives all critical interrupts 11 and non-critical interrupts 12 and controls the application of interrupts to the processor 7. When a critical interrupt is received, it passes through the masking function 21 to a priority encoder 22 where the set flag 13 is detected by a flag comparator 23 and triggers a disable function 24 which masks all non-critical interrupts 12 except for any current active interrupt. If the current active interrupt is a critical interrupt 11, then it is preempted only if the new critical interrupt is of a higher priority. If the current active interrupt is a non-critical interrupt, then it is pre-empted regardless of the priority level of the new critical interrupt. If there is no current active interrupt, then all non-critical interrupts are masked. This arrangement ensures that all critical interrupts 11 are serviced immediately within their relative priority scheme, regardless of previous, current or future activity on all other non-critical interrupts 12 associated with the other applications 6, thereby guaranteeing the latency requirement.

The automatic masking of non-critical interrupts by the disable function, once effected by a critical interrupt, remains active until reset by the critical system 8, as described further below. During this time, non-critical interrupts 12 are held pending in the masking function 21.

Once all active critical interrupts 11 have been executed, the processor will naturally return to complete any previous current and previously nested non-critical interrupts 14, 15, which may have been interrupted in the processor 7 by a critical interrupt. However, any new non-critical interrupts will not be executed. This is illustrated in FIG. 6 where interrupts 14 and 15 are shown as E and D.

At the first opportunity, when no active interrupts remain, the processor 7 returns control to the operating system 5, and the operating system is configured to execute critical tasks 3 before non-critical tasks 10. Therefore any critical tasks are executed by the processor 7 until a minimum priority critical task 25 is invoked by the operating system. Invoking task 25 is a mandatory feature of the system and serves to cause the processor 7 to issue a reset disable signal that passes to the interrupt controller 1 and resets the disable function 24 so that non-critical interrupts are no longer masked. The interrupt controller then proceeds to process any non-critical interrupts 12 and pass these to the processor 7 for execution. When no active non-critical interrupts 12 remain, the processor 7 returns control to the operating system 5, and the operating system 5 executes any pending non-critical tasks 10 in their order of relative priority. During this time, any interrupts either critical or non-critical may pre-empt the use of the processor.

When no further interrupts 11, 12 or tasks, 10 are pending, the operating system 5 returns control to the lowest priority task 16 in the complete system, which set the system into a power saving or idle mode.

Although the other applications 6 are all classified as non-critical applications, it is possible to give different priorities to the processes involved by invoking these as either ISRs 9 or lower priority non-critical tasks 17 or even lower priority non-critical tasks 10.

As a further feature, the masking function 21 includes an interrupt counter CNT which counts interrupts associated with separate interrupt sources. Therefore, although non-critical interrupts may be masked, the counter ensure that no interrupts are missed. Furthermore, it is possible to arrange that the counter generates an interrupt above a predetermined count, which may be a critical interrupt or a non-critical interrupt of an increased priority.

FIG. 2 serves to illustrate more clearly how the priority of the difference ISRs and tasks in FIG. 1 are linked and controlled by the operating system OS and the critical and non-critical interrupts IRQs.

FIG. 3 illustrates the effect of three critical interrupts A, B, and C followed by a non-critical interrupt D. Each of these interrupts has a difference priority as identified by the numeral that follows each, 0 being the highest priority. The top row in FIG. 3 illustrates the behaviour of a known system in which all interrupts are treated equally by a processor, and shows how the priority of the interrupts is the determining factor which causes interrupt A to take priority over interrupt B and C until it is pre-empted by interrupt D. Once ISR D is completed, the processor completes ISR A before ISR B and ISR C are executed. All tasks T3 and T12/10 follow the interrupts in priority.

In comparison, the bottom row in FIG. 3 illustrates the different behaviour of the system illustrated in FIG. 1 which gives priority to the critical interrupts A, B and C in their own order of relative priorities, before the critical Task T3 is executed. Control then reverts to the interrupt controller 1, which enables the non-critical interrupt D to execute the ISR D before control reverts back to the operating system to execute the non-critical task T10.

FIG. 4 illustrates a similar situation to that of FIG. 3, except that the non-critical interrupt D has a lower priority which changes the order in which the interrupts are performed in the known system shown in the top row but has no effect in the system of FIG. 1 shown in the bottom row.

FIG. 5 illustrates a situation in which three critical interrupts A, B and C are executed successively before a non-critical interrupt D is issued whilst a task T3 is being executed. The top row shows the known system in which the processor responds to the non-critical interrupt D by interrupting the task T3. The lower row in the drawing shows how the system in FIG. 1 defers the non-critical interrupt D until the critical task T3 has been completed.

FIG. 6 illustrates the nesting of non-critical interrupts as a result of a critical interrupt A. In the known system illustrated in the top row, the interrupts are processed strictly according to their priority, and the second interrupt E of higher priority interrupts the first interrupt D. A further lower priority interrupt A does not effect completion of ISR E, but this interrupt A is of higher priority than the first interrupt D, and therefore ISR A is executed next by the processor once ISR E is completed. A final interrupt F of lower priority than the interrupt D is then received, but this is deferred until ISR D is completed. Thereafter tasks T are executed in order of their priority. In comparison, the system of FIG. 1 gives immediate priority to the critical interrupt A and serves to defer completion of ISR E. Further, because the non-critical interrupt F is received at the interrupt controller after it has been masked by the critical interrupt A, this new non-critical interrupt F is not executed until after the critical tasks T3 have been executed.

FIG. 7 illustrates the operation of a software emulation of the system of FIG. 1. The drawing shows software management responses SWMgr to a number of different critical and non-critical interrupts. Starting with the system in an idle state, an initial non-critical interrupt D is checked for criticality, and is then passed for execution by the processor. A critical interrupt A then occurs, which is again checked for criticality, and because it is critical software masking is applied to non-critical interrupts. ISR A is then executed, during this process two further non-critical interrupts E and F are received. The system saves information relating to interrupt F, which has a higher priority than the interrupt E, before the system completes the ISR D which had been in progress when interrupted by the critical interrupt A. The system then saves information on the lower priority non-critical interrupt E, although in an alternative arrangement, information of the interrupts E and F could be saved at the same time. Because both stored interrupts E and F arrived after the critical interrupt A, these are not executed, and instead control is returned to the operating system. The operating system then executes the critical tasks T3, but a repeat non-critical interrupt E is then received. The system reviews the criticality of interrupt E, and because it is non-critical, defers this interrupt and continues with the critical tasks T3. Once the critical tasks T3 have been completed, as indicated by execution of the lowest priority critical task T12, system removes the software masking of the non-critical interrupts, and these are then executed in their order of relative priority, with the interrupt E finally being executed twice. The system then executes the lowest priority non-critical task T10 before it returns to the idle mode.

It may not be practical to assess each task and interrupt in a complex system and assign criticality on an individual basis. Rather, it may be more practical to divide the overall system into subsystems which are then deemed critical and non-critical as appropriate. In this somewhat coarse approach, every task and interrupt within the critical subsystem(s) has its criticality flag set whereas every task and interrupt within the non-critical subsystem(s) does not have its criticality flag set. Taking, as an example, the case where the overall system is a mobile telephone, an example of a critical subsystem is the software that controls the conduct of a call from the telephone and an example of a non-critical subsystem is the animation of an icon appearing on the display of the telephone.

Where criticality is determined on a coarse "by subsystem" basis, some tasks and/or interrupts of a subsystem that has been deemed critical may actually be less important to service than some tasks and/or interrupts of a subsystem that has been deemed non-critical. To ameliorate this problem, it is possible to elevate the priority of the task that resets the disable function 24.

The invention claimed is:

1. An interrupt control function adapted to control the execution of interrupt requests of differing criticality by a processor which is required to execute tasks of differing criticality under the control of a computer operating system; the interrupt control function being adapted to recognise critical and non-critical interrupt requests originating from different interrupt sources, and to recognise when the processor is required to execute each of critical and non-critical tasks; the interrupt control function being further adapted to pass critical interrupt requests to the processor for execution in preference to non-critical interrupt requests, to block non-critical interrupt requests to the processor when they coexist with critical interrupt requests or the processor is required to execute critical tasks, and to pass non-critical interrupt requests to the processor when they do not coexist with any critical interrupt requests and the processor has no critical tasks to be executed.

2. An interrupt control function as claimed in claim 1, further adapted to instruct the processor to execute a first critical Interrupt Service Routine ISR in response to a first critical interrupt having a first level of priority in preference to a second critical ISR in response to a second interrupt having a second level of priority if the first level of priority is higher than the second level of priority.

3. An interrupt control function as claimed in claim 2, further adapted, when the processor is executing the second critical ISR, to store the occurrence of the first critical interrupt if the first level of priority is lower than the second level of priority, such that the interrupt control system can instruct the operating system to execute the first critical ISR when the operating system is not executing the second ISR.

4. An interrupt control function as claimed in any one of claims 1-3, wherein if a non-critical interrupt is received when the processor is executing a critical ISR or a critical task, the occurrence of the non-critical interrupt is stored such that the interrupt control system may instruct the operating system to execute a non-critical ISR after the signal from the operating system has been received.

5. An interrupt control function as claimed in claim 4, wherein the occurrence of an interrupt is stored by incrementing a counter associated with a source of the interrupt, and the controller is decremented when the interrupt control system instructs the operating system to execute an ISR in response to the interrupt.

6. An interrupt control function as claimed in claim 5, wherein if the occurrence of the interrupt is stored thereby causing the associated counter to overflow, an overflow interrupt is generated, which may be designated as a critical interrupt, or a non-critical interrupt.

7. An interrupt control function as claimed in claim 6, in which an interrupt has a flag associated therewith, and if the flag is in a first state the interrupt is identified as being a critical interrupt, and if the flag is in a second state the interrupt is identified as being a non-critical interrupt.

8. An interrupt control function as claimed in claim 7 which responds to a flag in the first state by masking non-critical interrupts.

9. An interrupt control function as claimed in claim 8 which is reset so that non-critical interrupts are not masked once all critical tasks have been executed.

10. An interrupt control function as claimed in claim 9 which is reset on instruction from the processor.

11. An interrupt control function as claimed in claim 10, wherein the reset instruction is derived from a critical task.

12. An interrupt control function as claimed in claim 11, wherein the critical task that produces the reset instruction has the lowest level of priority of all critical tasks.

13. An interrupt control function as claimed in claim 1, which is implemented as a hardware interrupt controller which controls the passing of interrupts to the processor.

14. An interrupt control function as claimed in claim 1 which is implemented as software which runs on the processor.

15. An interrupt control function as claimed in claim 1 in combination with a processor which receives interrupts under control of the interrupt control function.

16. A timing critical system which incorporates a processor and interrupt control function as claimed in claim 15.

17. A mobile telephone handset which incorporates a critical system as claimed in claim 16.

18. A method of handling interrupts of differing criticality for execution by a processor which is required to execute tasks of differing criticality under the control of a computer operating system, the method comprising the steps of: recognising critical and non-critical interrupt requests originating from different interrupt sources; recognising when the processor is required to execute each of critical and non-critical tasks; passing critical interrupts requests to the processor for execution in preference to non-critical interrupt requests; blocking non-critical interrupt requests to the processor when they coexist with critical interrupt requests or the processor is required to execute critical tasks; and passing non-critical interrupt requests to the processor when they do not coexist with any non-critical interrupt requests and the processor has no critical tasks to be executed.

* * * * *

UNITED STATES PATENT AND TRADEMARK OFFICE
CERTIFICATE OF CORRECTION

PATENT NO. : 7,689,749 B2  Page 1 of 1
APPLICATION NO. : 11/665544
DATED : March 30, 2010
INVENTOR(S) : Eugene Pascal Herczog It is certified that error appears in the above-identified patent and that said Letters Patent is hereby corrected as shown below:

On the Title page of the patent, (73) Assignees: replace the following:

"MStar Software R&D, Ltd., Shenzen (TW);
MStar France SAS, Issy les Mouineaux (FR)"

with the following:

-- MStar Software R&D, Ltd., Shenzhen (CN)
MStar France SAS, Issy les Moulineaux (FR) --

Signed and Sealed this

Sixth Day of July, 2010

David J. Kappos
*Director of the United States Patent and Trademark Office*